(12) United States Patent
Black et al.

(10) Patent No.: US 8,151,192 B2
(45) Date of Patent: Apr. 3, 2012

(54) CONTEXT SENSITIVE HELP

(75) Inventors: Jason Eric Black, Redmond, WA (US); Ashwini Varma, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 746 days.

(21) Appl. No.: 12/024,287

(22) Filed: Feb. 1, 2008

(65) Prior Publication Data
US 2009/0199097 A1 Aug. 6, 2009

(51) Int. Cl.
*G06F 3/00* (2006.01)

(52) U.S. Cl. .................... 715/708; 715/705; 715/712

(58) Field of Classification Search .................. 715/708, 715/826, 794, 714, 707, 705
See application file for complete search history.

(56) References Cited

U.S. PATENT DOCUMENTS

| | | | |
|---|---|---|---|
| 4,992,972 A | 2/1991 | Brooks et al. | |
| 5,257,185 A * | 10/1993 | Farley et al. | 1/1 |
| 5,287,448 A * | 2/1994 | Nicol et al. | 715/707 |
| 5,535,321 A * | 7/1996 | Massaro et al. | 715/707 |
| 5,535,323 A | 7/1996 | Miller et al. | |
| 5,581,684 A | 12/1996 | Dudzik et al. | |
| 5,727,950 A * | 3/1998 | Cook et al. | 434/350 |
| 5,774,118 A * | 6/1998 | Hatakama | 715/707 |
| 6,233,570 B1 * | 5/2001 | Horvitz et al. | 706/11 |
| 6,434,619 B1 * | 8/2002 | Lim et al. | 709/229 |
| 6,615,253 B1 | 9/2003 | Bowman-Amuah | |
| 7,047,498 B2 | 5/2006 | Lui et al. | |
| 7,095,426 B1 * | 8/2006 | Childress | 715/794 |
| 7,117,189 B1 | 10/2006 | Nichols et al. | |
| 7,415,696 B2 * | 8/2008 | Cohen et al. | 717/100 |
| 7,490,292 B2 * | 2/2009 | Hennum | 715/714 |
| 7,814,420 B2 * | 10/2010 | Gerhart et al. | 715/705 |
| 7,895,519 B1 * | 2/2011 | Allegrezza et al. | 715/708 |
| 2003/0001875 A1 * | 1/2003 | Black et al. | 345/708 |
| 2003/0016238 A1 * | 1/2003 | Sullivan et al. | 345/705 |
| 2003/0122859 A1 * | 7/2003 | Aggarwal et al. | 345/708 |
| 2003/0140084 A1 * | 7/2003 | D'Angelo | 709/106 |
| 2004/0145601 A1 * | 7/2004 | Brielmann et al. | 345/708 |
| 2005/0223392 A1 | 10/2005 | Cox et al. | |
| 2005/0246638 A1 * | 11/2005 | Whitten | 715/708 |
| 2005/0268234 A1 | 12/2005 | Ross, Jr. et al. | |
| 2007/0185976 A1 | 8/2007 | Solis | |
| 2007/0226204 A1 * | 9/2007 | Feldman | 707/5 |

(Continued)

OTHER PUBLICATIONS

ALMA Common Software Architecture; G. Chiozzi, B. Gustafsson, B. Jeram; Atacama Large Millimeter Array; Revision 2.0; Sep. 26, 2001; pp. 1-53.

(Continued)

*Primary Examiner* — Doon Chow
*Assistant Examiner* — David Choi
(74) *Attorney, Agent, or Firm* — Merchant & Gould P.C.

(57) ABSTRACT

Systems and methods for providing context sensitive help on an electronic device. The system include a processor, an application attributes discovery module which provides one or more attributes associated with an application running on the electronic device, a system state discovery module which provides system information associated with components of the electronic device, a help infrastructure module which uses the system information and application attributes to determine a help context at the time a user invokes a request for help, a help context mapping module which includes one or more help contexts including a context node that best matches the system state information and which contains one or more help topic identifiers that are mapped to help topics, a help topic collection module that provides one or more help topics corresponding to the help topic identifiers and a help viewer that displays the help topics.

7 Claims, 8 Drawing Sheets

U.S. PATENT DOCUMENTS

| | | | |
|---|---|---|---|
| 2008/0109722 A1* | 5/2008 | Gengler et al. | 715/708 |
| 2008/0172635 A1* | 7/2008 | Ross et al. | 715/826 |
| 2009/0183072 A1* | 7/2009 | Stephenson et al. | 715/708 |
| 2009/0183237 A1* | 7/2009 | Cortes et al. | 726/4 |
| 2009/0199097 A1* | 8/2009 | Black et al. | 715/708 |
| 2010/0087175 A1* | 4/2010 | Roundtree | 455/414.1 |

OTHER PUBLICATIONS

Anatomy of the Microsoft Office System 2003; pp. 1-24.

Using XML in a Component Based Mediation Architecture for the Integration of Applications; XML Europe 2001; Yigang Xu; May 21-25, 2001; pp. 1-16.

* cited by examiner

```
<?xml version="1.0" encoding="utf-8"?>
<xs:schema xmlns:xs="http://www.w3.org/2001/XMLSchema">
  <xs:element name="contextnode">
    <xs:complexType>
      <xs:attribute name="value" type="xs:string" use="required"/>
      <xs:attribute name="IDs" type="xs:string" use="required"/>
    </xs:complexType>
  </xs:element>
  <xs:element name="appcontext">
    <xs:complexType>
      <xs:sequence>
        <xs:element ref="contextnode" minOccurs="0" maxOccurs="unbounded"/>
      </xs:sequence>
      <xs:attribute name="value" type="xs:string" use="required"/>
      <xs:attribute name="defaultIDs" type="xs:string" use="required"/>
    </xs:complexType>
  </xs:element>
  <xs:element name="contextmap">
    <xs:complexType>
      <xs:sequence>
        <xs:element ref="appcontext" minOccurs="1" maxOccurs="unbounded"/>
      </xs:sequence>
    </xs:complexType>
  </xs:element>
</xs:schema>
```

FIG. 6

```
700 ── <contextmap>
  702 ── <appcontext value="window.main" defaultIDs="0">
  703 ─┘
     706 ── <contextnode value="touchscreen:no" IDs="1"/>
            <contextnode value="layout:portrait" IDs="2 3 4"/>
     708 ── <contextnode value="layout:landscape" IDs="5 6 7"/>
            <contextnode value="layout:squarescreen" IDs="8 9 10"/>
     710 ── <contextnode value="network:disconnected" IDs="11"/>
     712 ── <contextnode value="timeofday:ninetofive" IDs="10 12 14"/>
            <contextnode value="timeofday:afterhours" IDs="13"/>
          </appcontext>
  704 ── <appcontext value="email.compose" defaultIDs="118 121">
     714 ── <contextnode value="schedule:busy" IDs="119"/>
     716 ── <contextnode value="network:connected" IDs="120"/>
            <contextnode value="network:disconnected" IDs="121 129"/>
          </appcontext>
        </contextmap>
```

FIG. 7

CONTEXT SENSITIVE HELP

BACKGROUND

Context sensitive help is help information that is provided to a user based on the operation being performed in a software application at the time the request for help is made. As such, context sensitive help is different than standard help that requires a user to search for a specific help topic or to select a help topic from an index of topics.

In traditional context sensitive help systems, references to help topics are inserted into the source code of an application and mapped to a specific help topic. Thus, there is a one-to-one mapping between an area in the application and a help topic. This can result inefficiencies if the help information changes during development and implementation of the application.

In practice, the development of application code and the creation of help topics for applications are done by two separate teams. Typically, application code is developed by software developers and help topics are written by a team of technical writers. Thus, coordination is needed between the developers and the help topic writers to ensure that context sensitive help topics are written for the correct areas of the application code. This can be a labor intensive process that creates inflexibility because code development is a dynamic process, subject to frequent change. Often, because of the need to meet product deadlines, the development of help topics is not made a priority. In some cases, there is insufficient time to add help topics to an application.

SUMMARY

According to one embodiment, a system for providing context sensitive help to an electronic device includes a processor containing an operating system, an application attributes discovery module, a system state discovery module, a help infrastructure module, a help context mapping module, a help topic collection module and a help viewer. The application attributes discovery module determines one or more attributes associated with an application running on the electronic device for which help is being requested. The system state discovery module provides system information associated with components of the electronic device. The help infrastructure module uses the application attributes and the system state information to determine a help context set associated with the application at the time a user makes a request for help. The help topic mapping module includes one or more application contexts each representing a combination of application attributes and system state information. The application contexts may also include help topic identifiers that are appropriate for an application context. A best match is found between an application context and the help context state. The help topic mapping module maps these help topic identifiers into help topics. The help context collection module stores the help topics that correspond to the help topic identifiers. The help topics are displayed on a help viewer.

According to another embodiment, a method for providing context sensitive help to a user of a mobile electronic device includes: receiving a request for help from a user of the mobile electronic device; identifying an application running on the mobile electronic device for which the request for help is being made; evaluating attributes of the application; determining system state information of the mobile electronic device; obtaining a help context set from an evaluation of the attributes and the system state information, the help context set obtained at runtime when the user makes a request for help; identifying an application context that best matches the help context set, the application context including one or more help topic identifiers; mapping a help topic identifier to a help topic; displaying the help topic on the mobile electronic device.

According to another embodiment, a computer readable medium contains computer executable instructions which when executed perform a method for providing context sensitive help to a user of an electronic device, the method including: receiving a request for help from a user; identifying an application running on the electronic device for which the request for help is being made; evaluating the attributes of the application; determining system state information for the electronic device; obtaining a help context set from an evaluation of the attributes and the system state information, the help context set obtained at runtime when the user makes a request for help; identifying an application context that best matches the help context set, the application context including one or more help topic identifiers; mapping a help topic identifier to a help topic; displaying the help topic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings:

FIG. 6 shows an example XML schema that can be used in an example context sensitive help system for an electronic device.

FIG. 7 shows an example mapping table that can be used with the XML schema of FIG. 6 to map help contexts into help topic identifiers.

DETAILED DESCRIPTION

The present application is directed to systems and methods for providing context sensitive help for an electronic device. In the present application, the help topics are associated with a help context set that is determined from application attributes and from and a state of system components at the time a user's request for help is made. Help topic identifiers corresponding to the help context set are mapped to one or more help topics.

Figure 1:
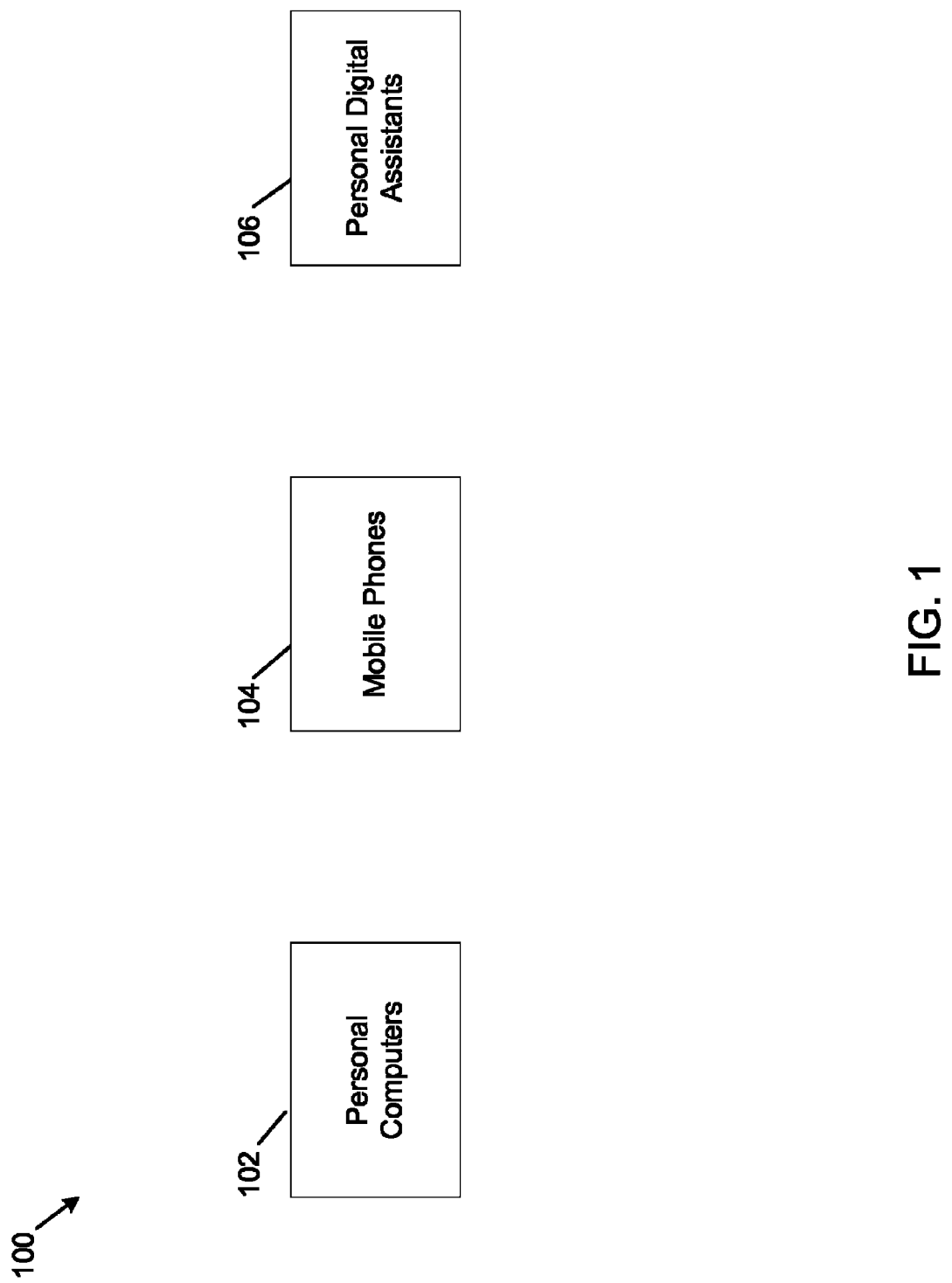
FIG. 1 shows example electronic devices for which context sensitive help may be provided.

FIG. 1 shows example electronic devices 100 for which context sensitive help may be used. In example embodiments, electronic devices 100 include personal computers 102. In other examples, the electronic devices include mobile or handheld devices such as mobile phones 104 and personal digital assistants (PDAs) 106. An electronic device 100 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is an operating system ("OS") and applications. The OS is a program that manages the hardware and software resources of the electronic device 100. The applications utilize the resources of the electronic device 100 to directly perform tasks specified by the user. Other configurations for the electronic device 100 are possible.

Figure 2:
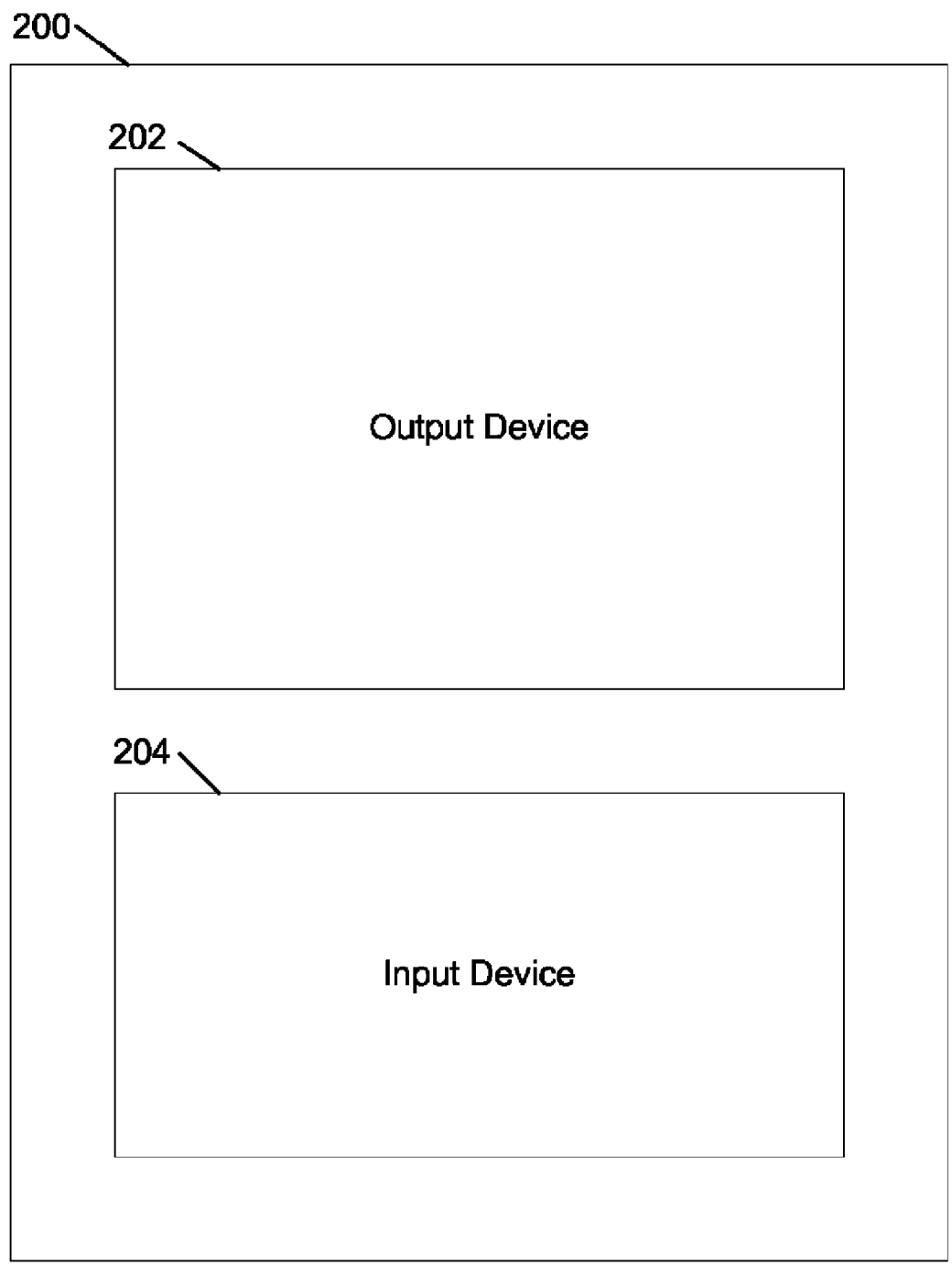
FIG. 2 shows example keypad and display of an example electronic device.

FIG. 2 shows an example electronic device 200 that includes an input device 204 and an output device 202. The electronic device 200 can be the personal computer 102, the mobile phone 104, the PDA 106, or another similar device as described above. In example embodiments, the input device 204 may be a keyboard, a touch screen or any similar device which permits user input. In example embodiments, the output device 202 may be a CRT, a LCD device or a touch screen that also provides display capability.

As the user of the electronic device 200 uses one or more application programs running on the electronic device 200, the user can request help with the program. When a request for context sensitive help is made, the user depresses a key on the input device 204 associated with help. For example, this may be a function key programmed to access help or it may be an actual Help key. After the user requests help, the electronic device 200 is programmed to provide help topics on the output device 202, as described further below.

Figure 3:
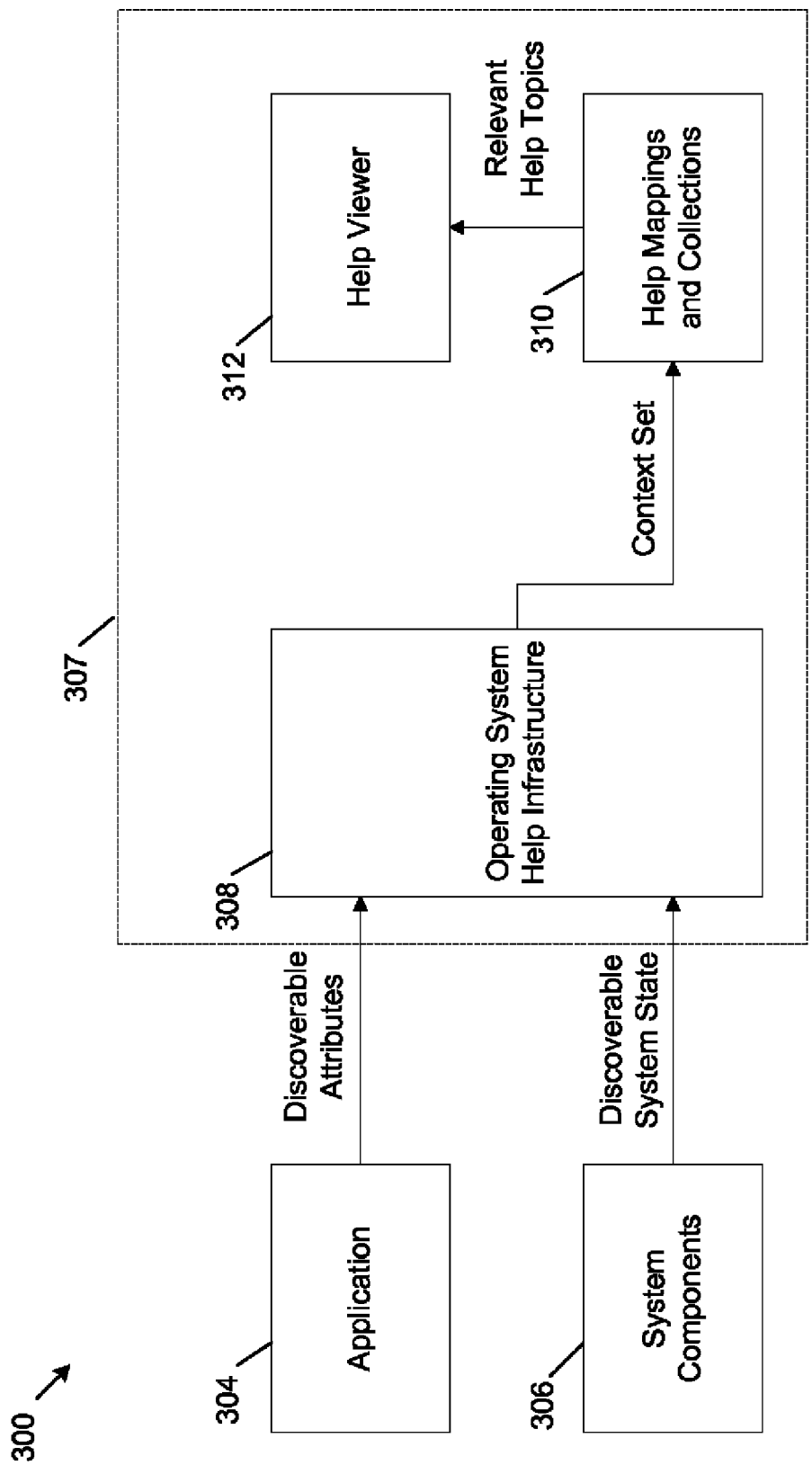
FIG. 3 shows a functional diagram of an example context sensitive help system for an electronic device.

Referring now to FIG. 3, example functional modules 300 of the electronic device 200 are shown. The modules 300 include one or more applications 304 and system components 306. Also included is a context sensitive help system 307 including an operating system help infrastructure 308, help mappings and collections 310 and a help viewer 312.

The applications 304 have attributes associated with each application. For example, a running application has a process name that identifies the process. As another example, an application written in an object oriented programming language has a class name that is an attribute of the application. These attributes are discoverable and are collected by the operating system help infrastructure 308.

Along with discoverable attributes, the system components 306 provide discoverable system state information. For example, discoverable system state information can include the type of device the application is running on, the type of network the user is on, the battery level of the device, the free/busy status of the user's calendar, signal strength if the device is a mobile phone, etc. The discoverable system state information is also collected by the operating system help infrastructure 308.

When a user of the electronic device 200 makes a request for help, the discoverable attributes and the discoverable system state information are used by the operating system help infrastructure 308 to determine a help context set that reflects the application attributes and system state at the time the request for help is made. The help context set is determined dynamically, based on the state of the application and system when the user requests help and is used to determine the appropriate set of help topics for a particular help request.

As an example, if the user is composing an email message on a mobile phone and wants to attach a photo to the email message but doesn't know how, the user makes a request for help, as described above. Once the user requests help, the application attributes detected by the system indicate that the user is running an email program and is trying to attach a photo. The example system state information indicates that the user has cell phone coverage and is connected to the Internet with the data connection of the mobile phone. Some other system state information that might be relevant include the user's GPS coordinate, the time of the day, whether they have anything on their calendar at the present time, for example whether they are late for a meeting, etc. Additional system state information may include information from the system registry, information from the clock, information from the networking stack, information from the radio stack, information from the battery driver, information from the system calendar and information regarding plug-ins being used, etc. All this information is harvested by the system and is used in determining a help context set that reflects the user's request for help.

Still referring to FIG. 3, the help context set is used by Help Mappings and Collections 310 to map the help context set into help topics relevant to the help context set, as described further below. The relevant help topics are then provided to Help Viewer 312 for display to the user.

Figure 4:
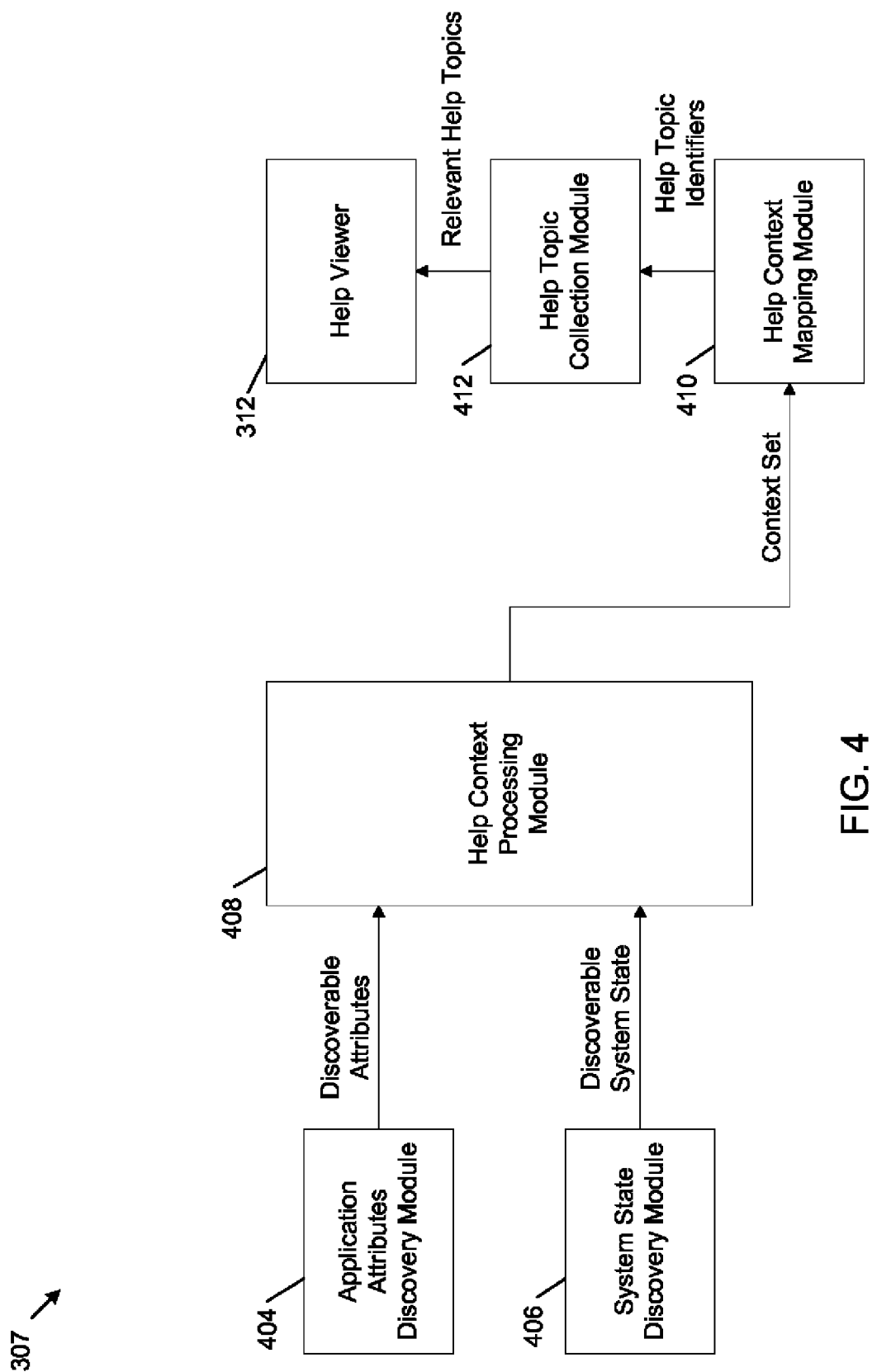
FIG. 4 shows a modular diagram of components of an example context sensitive help system for an electronic device.

FIG. 4 shows additional details of the example context sensitive help system 307. The context sensitive help system 307 contains an application attributes discovery module 404, a system state discovery module 406, and a help context processing module 408. The example context sensitive help system 307 also includes a help context mapping module 410, a help topic collection module 412 and a help viewer 312.

The application attributes discovery module 404 identifies attributes of the application currently being run on the system and provides these attributes to the help context processing module 406. As noted above, example discoverable attributes include the name and type of the application, the object class of the application, the name of any file attachments opened by the application, etc.

The system state discovery module 406 provides a snapshot of system state runtime information at the time the request for help is made. As noted above, relevant system information identified by the system state discovery module include the user's network state, cell coverage state, battery level, free/busy status of the user's calendar, whether the user is connected to the Internet, etc.

The help context processing module 408 uses the discoverable attributes and the discoverable system state information to determine a help context set. The help context set reflects the state of the system and application at the time a user requests help and is used to determine an appropriate set of help topics for the user. The use of a help context set permits context sensitive help to be provided to the user based on the collected application and system state attributes at the time the user's request for help is made, as described further below. Such a system is flexible in that help is provided based on the current context in which the user requests the help.

The help context mapping module 410 contains mapping tables that are stored externally to the application's source code, typically in an extensible markup language (XML) file. The mapping tables contain one or more application contexts that represent specific combinations of application attributes and system state information.

In the example shown, mapping can be done in two stages. In the first stage, the help context mapping module 410 finds a best match between an application context and the help context set. In the second stage, help topic identifiers from the matched help context set are mapped to help topics in the help topic collection module 412. These help topics are then displayed to the user via the help viewer 414.

Figure 5:
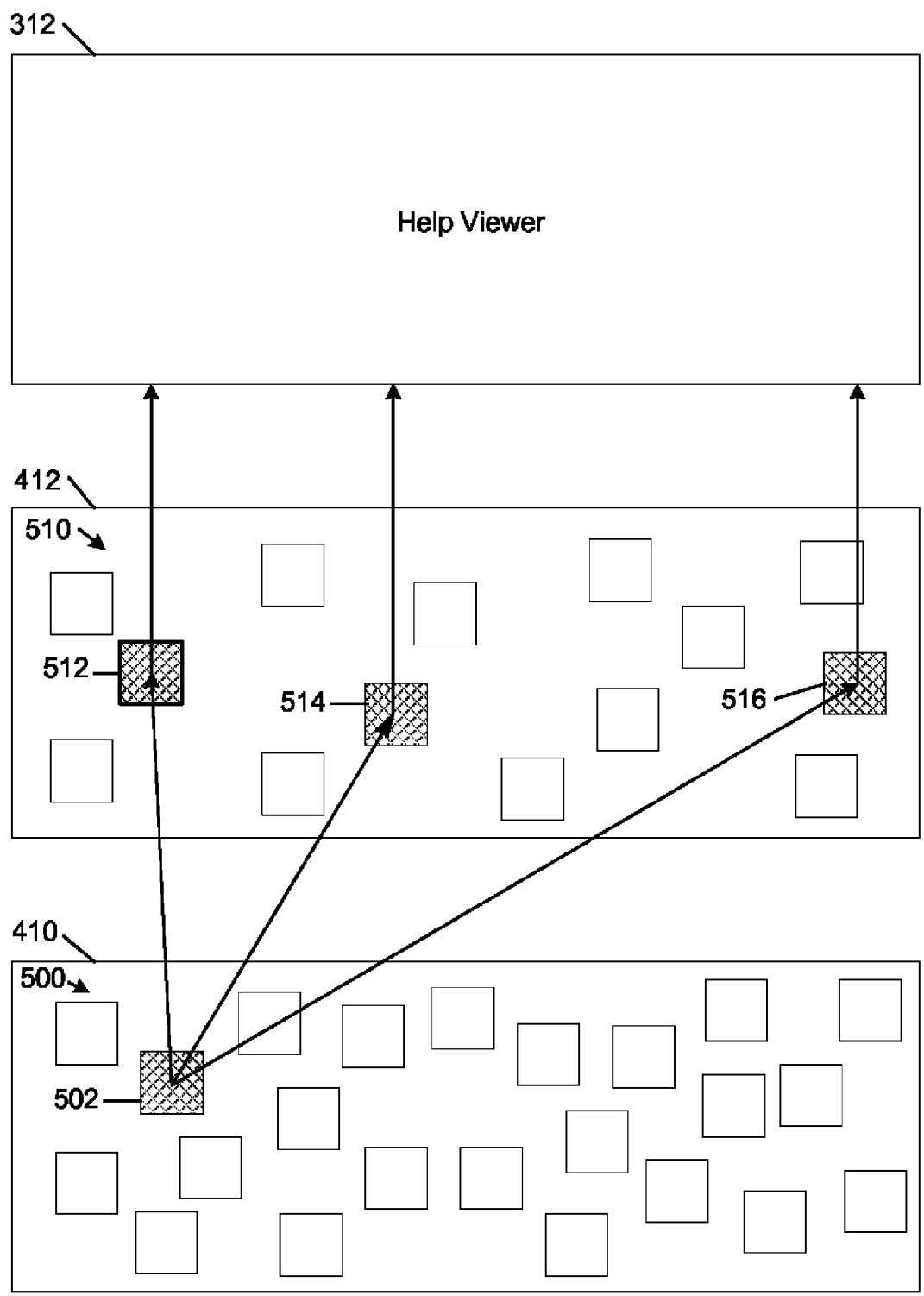
FIG. 5 shows a diagram of help context mapping in an example context sensitive help system for an electronic device.

FIG. 5 shows the help context mapping module 410 and the help topic collection module 412 in more detail. The help context mapping module 410 contains a plurality of application contexts 500 that are associated with a help context set. When the user makes a request for help, the help infrastructure module interrogates the help context mapping module 410 and finds a best match between an application context and a help context set. Each application context contains identifiers of help topics that provide information appropriate to the help request.

The help topic identifiers map to help topics 510 in the help topic collection module 412. In the example shown in FIG. 5, the help context set maps to application context 502. Application context 502 includes help topic identifiers that map to help topics 512, 514 and 516 in the help topic collection module 412. The help topics 512, 514 and 516 are then displayed on the help viewer 312. Since each application context 500 represents a different help context set, the help topic identifiers for the matched application context best reflects the help context set for the application for which help is requested.

FIG. 6 shows an example XML schema 600. As described above, the XML schema 600 defines one or more mapping tables containing one or more application contexts that represent specific combinations of application attributes and system state information.

This example XML schema 600 includes a context map 616 that is a set of application contexts. Each example application context 608 includes an attribute identifier 612 and zero or more context nodes 610. The example attribute identifier 612 describes the application context as determined by the discoverable application attributes (e.g., compose an email message). Example help topic identifiers, indicated by default ID string 614, are included with each attribute identifier. The example context nodes 610 represent system state information. An example context node schema 602 includes a context node identifier 604 and one or more help topic identifiers, indicated as ID string 606.

FIG. 7 shows an example context map 700 providing an example of how the XML elements in the XML schema 600 are used in context mapping. The example context map 700 shows two example application contexts 702 and 704. Each application context includes an identifier that is determined by the discoverable attributes of the application. For example, application context 702 represents a main window that is active on the electronics device. Associated with example application context 702 are help topic identifiers, indicated by default IDs 703, that are mapped to help topics. Also included within example application context 702 is a listing of context nodes (706-712) that represent system state information and which include help topic identifiers corresponding to the current system state. For example, if the main window is a touch screen, example context node 706 is selected and help topic identifier 1 is used. If the main window is in landscape format, context node 708 is selected and help topic identifiers 5, 6, and 7 are used. If the electronic device is not connected to a network, context node 710 is selected and topic identifier 11 is used. If the system time indicates that the time of day is between 9 AM and 5 PM, context node 712 is selected and help topic identifiers 10, 12 and 14 are used.

Still referring to FIG. 7, example application context 704 includes an identifier indicating that an email message is being composed. For this application context, help topic identifiers 118 and 121 are used. If at the time the email message is being composed, the user's calendar schedule indicates that the user is busy, context node 714 is selected and help topic identifier 119 is used. If the user is connected to a network while composing the email message, context node 716 is selected and help topic identifier 120 is used.

When matching a help context set to an application context, the context map 704 is interrogated by the help infrastructure to locate an application context that best matches the help context set. It will be appreciated that the XML structure shown in FIG. 7 is simplified for discussion purposes. In actuality, the context map 704 may contain many application contexts including many context nodes and the context map may not be human readable.

Figure 8:
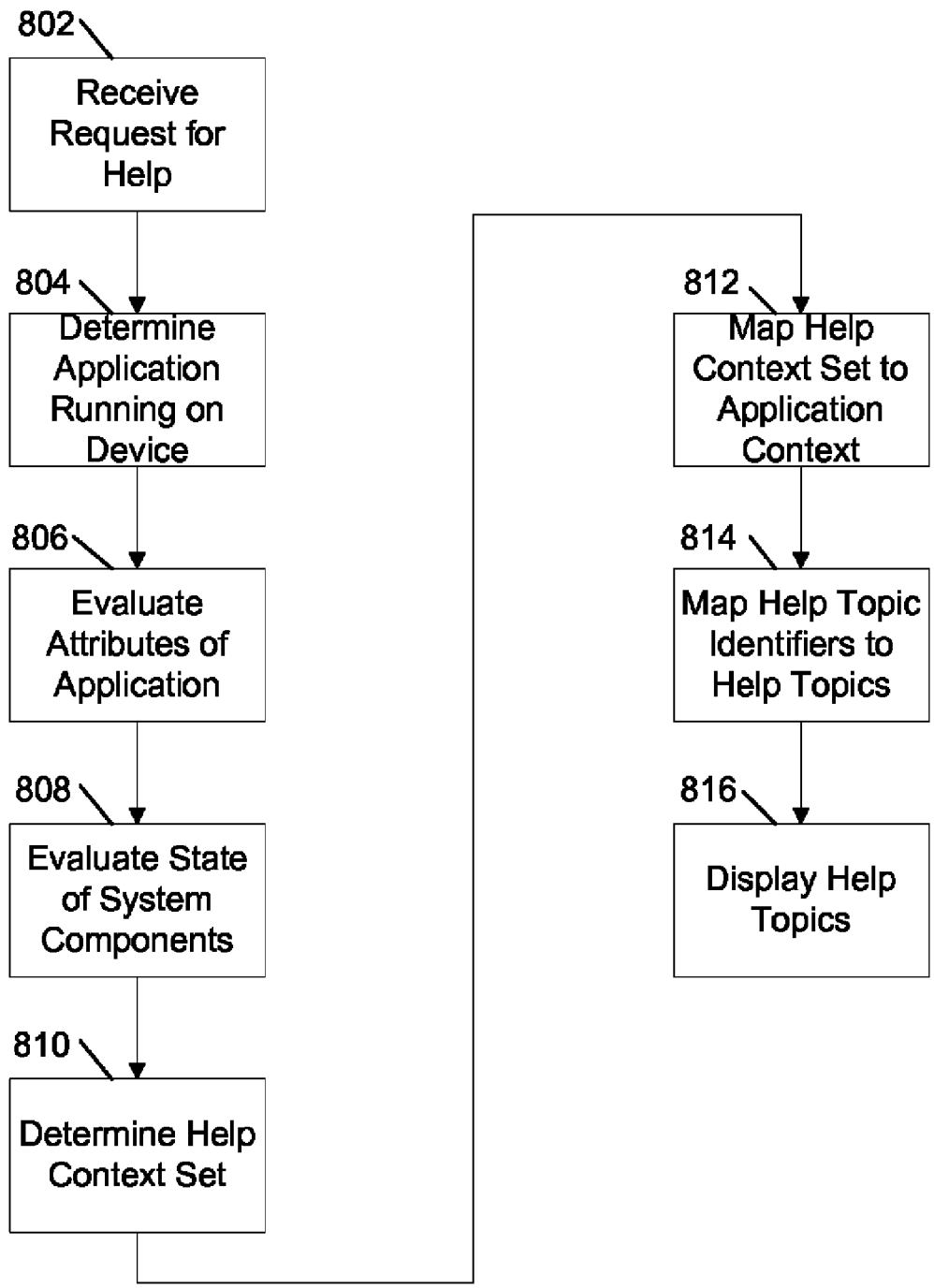
FIG. 8 shows a flowchart for an example method for providing context sensitive help system on an electronic device.

FIG. 8 is a flowchart showing a method for displaying context sensitive help on an electronic device. At operation 802, a request for help is received from a user of the electronic device. At operation 804, the operating system of the electronic device determines the application running on the electronic device. At operation 806, the application attributes discovery module determines and evaluates the attributes of the application (for example the name and type of the application). At operation 808, the system state discovery module determines and evaluates system state information that reflects the system state at the time the request for help is made (for example the date and time, the user's calendar, the status of a network connection). At operation 810, the help context processing module processes the discoverable attributes and the discoverable system state information to determine a help context set that reflects the type of help information a user would need. At operation 812, the help context processing module interrogates the help context mapping module to find a best match between an application context in the help context mapping module and the help context set. At operation 814, the help topic collection module maps help topic identifiers from the selected application context into help topics stored in the help topic collection module. At operation 816, the selected help topics are displayed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for providing context sensitive help for an electronic device, the system comprising:
    a central processing unit;
    a data storage device;
    an application attributes discovery module providing one or more attributes associated with an application running on the electronic device, wherein the attributes include the name and type of application running;

a system state discovery module providing system discoverable state information associated with components of the electronic device;

a help infrastructure module using the system information and the attributes to determine a help context set, the help context set being determined at a time a user invokes a request for help;

a help context mapping module, the help context mapping module being included on the electronic device and being external to the application's executable code on the electronic device, the help context mapping module including one or more application contexts, wherein the help context mapping module contains mapping tables, wherein the mapping tables are contained in XML files, the application contexts including one or more first help topic identifiers mapped to one or more first help topics, each of the application contexts including one or more context nodes, each of the one or more context nodes being associated with system state information, each of the one or context nodes including one or more second help topic identifiers mapped to one or more second help topics, at least one of the first help topic identifiers being an identifier associated with the application running on the electronic device and at least one of the second help topic identifiers being associated with the discoverable system state information as related to the application running on the electronic device, the first help topic identifiers associated with the discoverable system state information being different than the second help topic identifiers associated with the application running on the electronic device;

a help topic collection module providing the first help topics and the second help topics, the help topic collection module being external to the application's executable code;

and a help viewer, the help viewer displaying the help topics;

wherein the help infrastructure module obtains a best match between the help context set and an application context and wherein help topic identifiers are selected for mapping to help topics based on this best match.

2. The system of claim 1, wherein the attributes include an operation being performed by the application at the time the help request is made.

3. The system of claim 1, wherein the system information is selected from the group consisting of: information from the system registry, information from the clock, information from the networking stack, information from the radio stack, information from the battery driver, information from the system calendar and information regarding plug-ins being used.

4. A method for providing context sensitive help to a user of a mobile electronic device, the method comprising:

receiving a request for help from a user of the mobile electronic device, wherein the request for help originates from a mobile phone;

identifying an application running on the mobile electronic device for which the request for help is being made;

evaluating attributes of the application, wherein the attributes including the name and type of the applications running;

determining system state information of the mobile electronic device;

obtaining a help context set from an evaluation of the attributes and the system state information, the help context set obtained at runtime when the user makes a request for help;

identifying an application context and a context node that best matches the help context set, the application context including one or more first help topic identifiers, at least one of the first help topic identifiers being an identifier associated with the application running on the mobile electronic device, the context node being one of one or more context nodes included with the application context, each context node including one or more second help topic identifiers associated with the system state information as related to the application running on the mobile electronic device, the first help topic identifiers being different from the second help topic identifiers;

mapping using mapping tables to map a first help topic identifier to a first help topic, the first help topic being associated with the application running on the electronic device, the mapping tables being included on the mobile electronic device and being external to the application running on the electronic device;

mapping a second help topic identifier to a second help topic, the second help topic being associated with the system state information;

and displaying the help topic on the mobile electronic device.

5. The method of claim 4, wherein the attributes including the operation being performed by the application at the time the help request is made.

6. The method of claim 4, further wherein the system state is selected from the group consisting of: information from the system registry, information from the clock, information from the networking stack, information from the radio stack, information from the battery driver, information from the system calendar and information regarding plug-ins being used.

7. A computer readable storage medium containing computer executable instructions which when executed perform a method for providing context sensitive help to a user of an electronic device, the method comprising:

receiving a request for help from a user, the help request originating from a mobile phone;

identifying an application running on the electronic device for which the request for help is being made;

evaluating the attributes of the application, the attributes including an operation being performed by the application at the time the help request is made;

determining system state information for the electronic device, the system state information being selected from the group consisting of: information from the system registry, information from the clock, information from the networking stack, information from the radio stack, information from the battery driver, information from the system calendar and information regarding plug-ins being used;

obtaining a help context set from an evaluation of the attributes and the system state information, the help context set obtained at runtime when the user makes a request for help;

identifying an application context and a context node that best matches the help context set, the application context including one or more first help topic identifiers associated with the application running on the electronic device, the context node being associated with the system state information, the context node being one of one or more context nodes included with the application context, each context node including one or more second help topic identifiers associated with a specific system state, one of the context nodes corresponding to a current system state, the first help topic identifiers being different from the second help topic identifiers;

using mapping tables to map a first help topic identifier to a first help topic, the first help topic being associated with the application running on the electronic device, the mapping tables being included on the electronic device and being external to the application's executable code on the electronic device, wherein the mapping tables are contained in XML files including an XML schema with a context map having set of application contexts, and wherein each of the application contexts includes an attribute identifier describing one of the application contexts as determined by discoverable application attributes, and one or more context nodes representing the system state information;

mapping a second help topic identifier to a second help topic, the second help topic being associated with the current system state; and displaying the first help topic and the second help topic.

* * * * *

UNITED STATES PATENT AND TRADEMARK OFFICE
CERTIFICATE OF CORRECTION

| | |
|---|---|
| PATENT NO. | : 8,151,192 B2 |
| APPLICATION NO. | : 12/024287 |
| DATED | : April 3, 2012 |
| INVENTOR(S) | : Jason Eric Black et al. |

It is certified that error appears in the above-identified patent and that said Letters Patent is hereby corrected as shown below:

In column 7, line 20, in Claim 1, before "context" insert -- more --.

Signed and Sealed this
Ninth Day of October, 2012

David J. Kappos
*Director of the United States Patent and Trademark Office*